(12) United States Patent
Hoy

(10) Patent No.: US 8,538,007 B2
(45) Date of Patent: Sep. 17, 2013

(54) TELECOMMUNICATIONS INTERFACE

(75) Inventor: Michael D Hoy, Ipswich (GB)

(73) Assignee: British Telecommunications public limited company, London (GB)

( * ) Notice: Subject to any disclaimer, the term of this patent is extended or adjusted under 35 U.S.C. 154(b) by 1168 days.

(21) Appl. No.: 12/096,859

(22) PCT Filed: Nov. 28, 2006

(86) PCT No.: PCT/GB2006/004440

§ 371 (c)(1),
(2), (4) Date: Jun. 10, 2008

(87) PCT Pub. No.: WO2007/071906

PCT Pub. Date: Jun. 28, 2007

(65) Prior Publication Data

US 2008/0279365 A1 Nov. 13, 2008

(30) Foreign Application Priority Data

Dec. 23, 2005 (EP) ..................................... 05258060

(51) Int. Cl.
*H04M 1/00* (2006.01)

(52) U.S. Cl.
USPC ............ 379/403; 379/401; 379/405; 379/412

(58) Field of Classification Search
USPC .............................. 379/399.01, 399.1–413.04
See application file for complete search history.

(56) References Cited

U.S. PATENT DOCUMENTS

| 4,156,263 | A | * | 5/1979 | Comerford et al. ............. 361/42 |
| 4,178,485 | A | * | 12/1979 | Cowpland et al. ............ 379/382 |
| 6,566,957 | B1 | * | 5/2003 | Caine ............................ 330/296 |
| 7,349,536 | B1 | * | 3/2008 | Erdely et al. ............. 379/399.01 |
| 2004/0120507 | A1 | * | 6/2004 | Pooladian ................ 379/387.01 |

FOREIGN PATENT DOCUMENTS

| WO | 98/30003 | 7/1998 |
| WO | 00/74328 | 12/2000 |

OTHER PUBLICATIONS

International Search Report for PCT/GB2006/004440 mailed May 2, 2007.

* cited by examiner

*Primary Examiner* — Duc Nguyen
*Assistant Examiner* — Ibraham Sharifzada
(74) *Attorney, Agent, or Firm* — Nixon & Vanderhye P.C.

(57) ABSTRACT

In order to provide unbalanced ringing when an exchange line card provides a balanced ringing output the interface provides a ringing detector in circuit with a customer pair. On detecting balanced ringing signals from the line card, the interface takes over the customer line pair and provides unbalanced ringing signals to the customer and monitors for customer answer. By inserting the interface in circuit at the main distribution frame of an exchange, legacy customer premises equipment which is unable to respond to balanced signalling can be provided with an appropriate ringing signal without the necessity to provide differing line cards at the exchange.

12 Claims, 3 Drawing Sheets

TELECOMMUNICATIONS INTERFACE

This application is the U.S. national phase of International Application No. PCT/GB2006/004440 filed 28 Nov. 2006 which designated the U.S. and claims priority to European Patent Application No. 05258060.2 filed 23 Dec. 2005, the entire contents of each of which are hereby incorporated by reference.

BACKGROUND

1. Technical Field

The present invention relates to a telecommunications interface and more particularly to such an interface for insertion between an exchange line and an outgoing customer line.

2. Description of Related Art

New generations of telecommunications switching equipment are being installed which have high capacity and provide high speed broadband connections as well as point to point communication.

In the United Kingdom British Telecommunications are installing a new network which will carry broadband, voice, data and television signals over the network using internet protocol signalling. Although between switches (routers) VoIP (Voice over IP) technology will be used, legacy customer telephone equipment connected at consumer premises still requires to receive analogue signals and in particular alerting signals to activate the customer telephone equipment.

At the same time, because broadband (ADSL, DSL) signals may be carried over the local loop to the customer premises, it is essential that signalling on the local loop does not significantly increase signal to noise ratios thereon Accordingly there is a tendency to move towards balanced (analogue) ringing signals on the A & B legs of the local loop to the customer premises. These facilities and others such as responding to call answer or telephone off-hook conditions are provided by a customer line circuit connected at the switch to the A & B legs of the customer line.

In order to simplify the provision of services at the edge of the network (that is in the switch or router closest to the customer) it is desirable to minimise the number of variants of line card which need to be provided to service differing types of customer premises equipment which may be connected thereto.

It is known that a substantial number of private branch exchanges (PBX) currently in use are not designed for use with balanced ringing signals and therefore do not respond to the receipt of this kind of signalling. There are also believed to be a number of legacy telephones, facsimile machines and the like which are unresponsive to balanced ringing signals.

This problem arises not only in the United Kingdom but also in North America where it is known that, historically, telephone network providers have used unbalanced ringing signals.

BRIEF SUMMARY

According to the present invention there is provided an interface for insertion in a telephone line between an exchange line and an outgoing customer line, said interface being arranged to detect balanced analogue signalling from the exchange line, to disconnect the outgoing customer line from the exchange line and to apply an unbalanced analogue signal to the outgoing customer line during the presence of the balanced analogue signalling, and, during absence of the balanced analogue signalling to provide a metallic path from the exchange line to the outgoing customer line.

Preferably the interface is also responsive to unbalanced signalling from the exchange line to perform the same functions to facilitate preparation of outgoing customer lines during replacement of local telephone switches.

The interface may also include a loop detector responsive to a connection across the outgoing customer line to provide a corresponding loop to the exchange line and to disconnect the unbalanced analogue signal prior to providing the metallic path between the exchange line and the outgoing customer line.

A by-pass connection between the exchange line and the outgoing customer line may also be provided, said by-pass connection including a high pass filter to permit the transmission of digital signals while the metallic path between the exchange line and the outgoing customer line is disconnected.

Low pass filters, either static or switched, may be included to prevent transient signals caused by switching from affecting digital signal on the outgoing customer line.

BRIEF DESCRIPTION OF DRAWINGS

An interface in accordance with the invention will now be described by way of example only with reference to the accompanying drawings of which.

DETAILED DESCRIPTION

Figure 1:
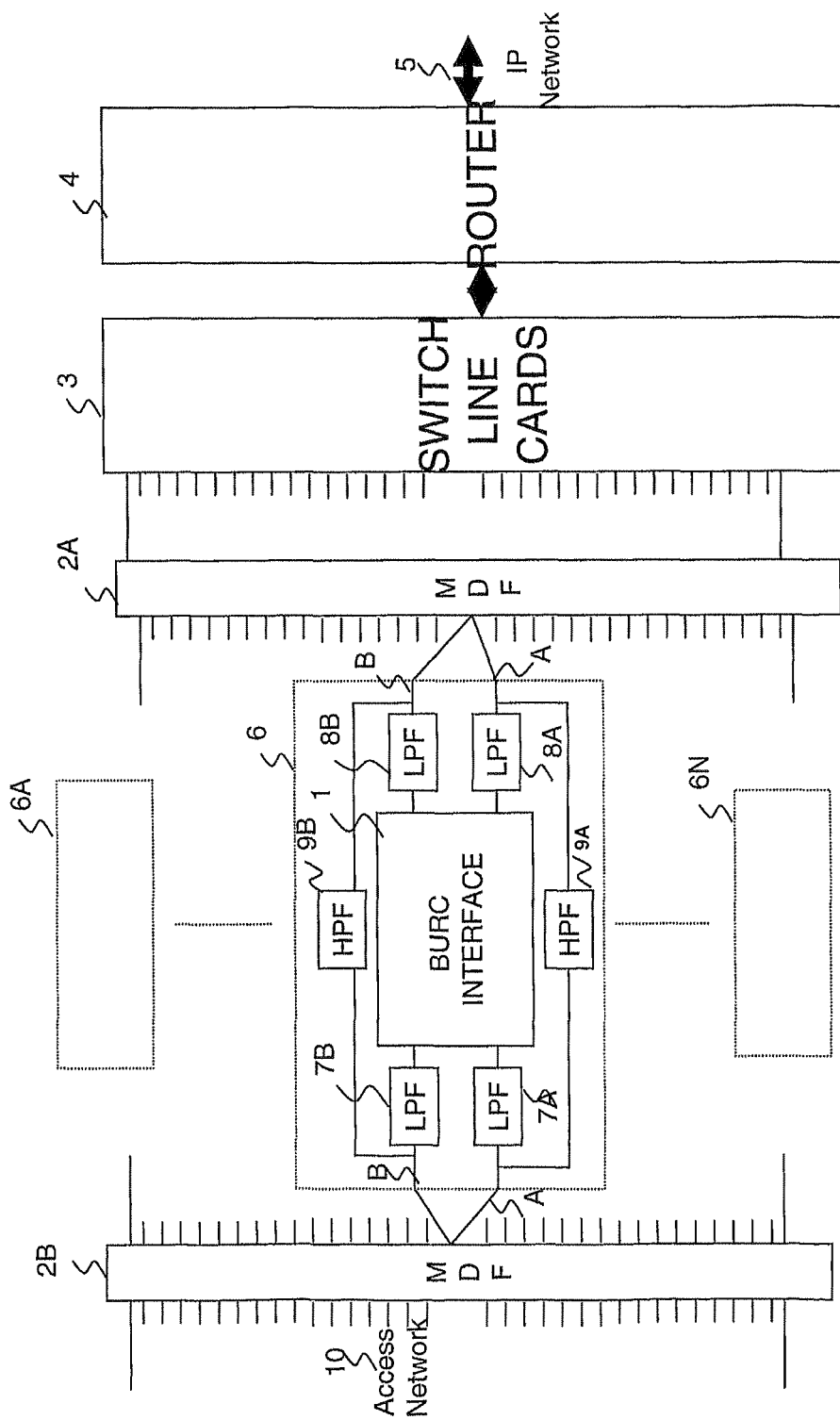
FIG. 1 is a block schematic diagram showing the location of the interface.

Referring first to FIG. 1, the BURC interface 1 is connected between main distribution frame 2A, 2B jumpering on the E side of the exchange between a switch line card and the access network. The switch line cards 3 are provided, one per customer, to provide the normal telephony functions to a customer providing functions including detecting call answer, outputting of CLI and ringing, detecting customer premises equipment loop, dialing and the like. Ringing output from a customer line card when a call arrives at the router 4 from the IP Network 5 (although the line cards 3 could also be at the network edge of other kinds of PSTN whether analogue or digital) and, in current practice will usually be in the form of a balanced sinusoidal signal applied in opposite phase on the A & B legs of the line pair leading to the customer premises.

It will be noted that in contemporary communication systems the line pair of the access network may be used for many functions apart from traditional telephony service (POTS) and may be carrying high speed broadband digital signalling (for example ADSL or DSL signalling), alarm and monitoring signalling (Out of Band (OOB) signals) and may use techniques such as line reversal to trigger some responses to signalling such as to wake up customer premises equipment for additional pre-ring or no-ring call scenarios. It is accordingly essential that any apparatus inserted in the circuit between the line cards 3 and the customer premises equipment is neutral in its effect on these services.

Accordingly the interface package 6 in which the BURC interface 1 is provided includes a number of low pass filters, 7A, 7B, 8A, 8B which prevent high frequency signalling being passed to the interface and high pass filters 9A, 9B which allow such signals to bypass the BURC interface 1 regardless of its active or inactive status at any particular time.

One interface 6 will be required for each customer line which responds only to unbalanced ringing when the corresponding line output card 3 produces alerting signals of a different kind. Thus in the present case, interface packages 6A to 6N are provided, one for each of the customer lines affected in the access network (local loop) 10. For the avoidance of doubt it is here noted that the interface circuit is inserted by wiring at the MDF on the E-side of the exchange output. In practice a miscellaneous equipment rack is provided in which the interface cards are provided and 48 interfaces are provided on a standard double Eurocard. Up to 12 such cards can be provided in a single shelf using the first 12 slots of the shelf using the remaining positions to be used to house a dual 75 v RMS ringing generator (to provide main and standby ringing), power supply units and alarm monitoring apparatus.

Where the ringing output of the switch line cards 3 is correct from the customer premises equipment at the end of the access network 10, direct jumpering between the distribution frames 2A, 2B is used in normal manner to link between line cards and the correct customer output line.

Figure 2:
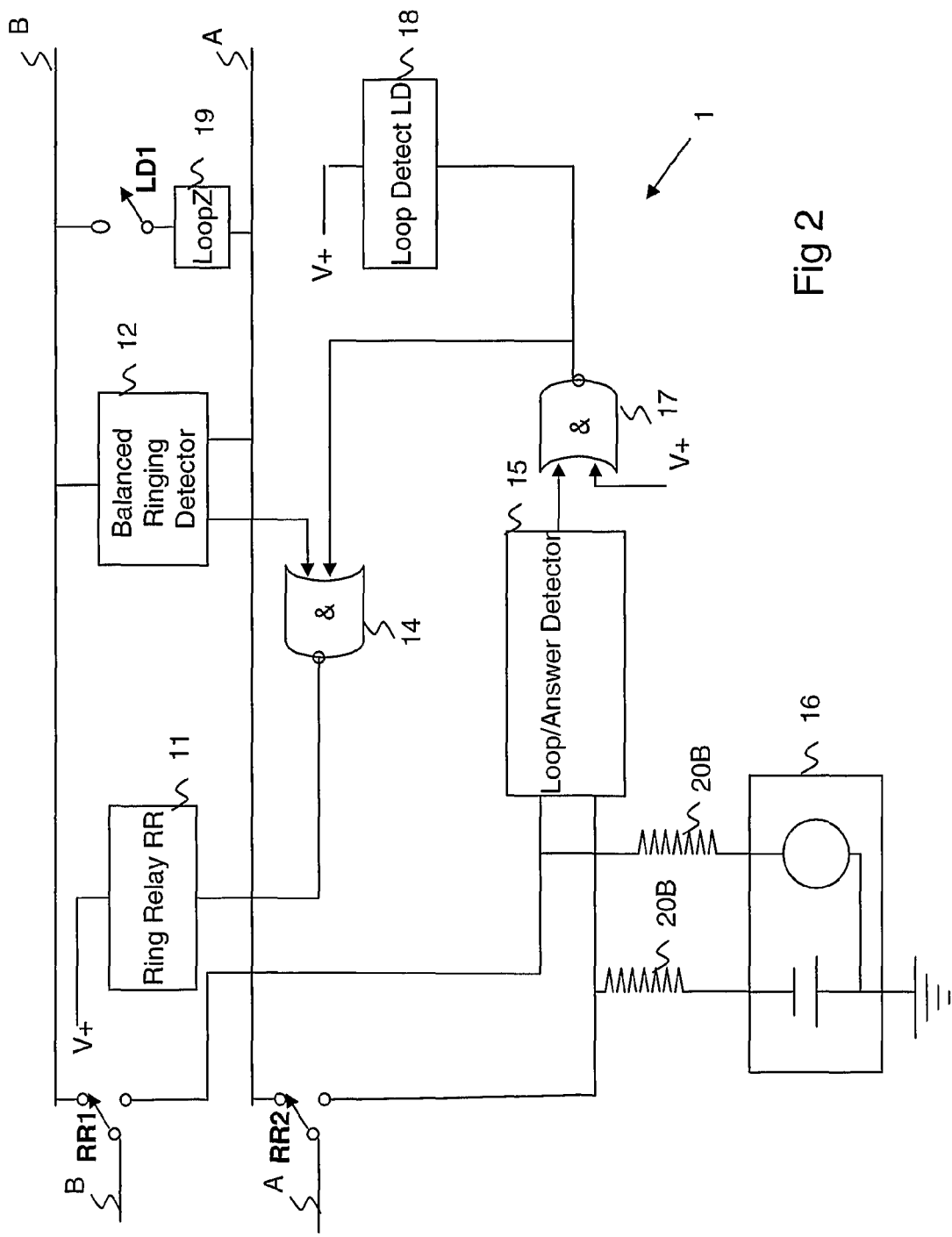
FIG. 2 is a block schematic diagram of the interface.

Turning now to FIG. 2, the A & B legs of the line pair to the right of the diagram are connected to the switch line cards (3 of FIG. 1) and, except when ringing signals are present thereon, are directly connected to the corresponding legs of the line pair to the access network (10 of FIG. 1) on the left of the diagram. Thus, unless ringing signals are present, the circuit has no effect on normal POTS responses by the line card to conditions arising on the access network line pair. A ring relay 11 is provided which in its normal (un-operated) state ensures that contacts RR1 and RR2 respectively connected in the B and A legs keep the rest of the circuit ineffective and all battery conditions are derived from the line card.

Now when ringing occurs on the A & B legs from the line card, a detector 12 across the pair detects the start of the ringing signal and provides an output signal to the NAND gate 14. Because a loop detector 15 is not at this stage connected across the A & B legs its output, inverted by the NAND gate 17 will also be positive at the input of NAND gate 14 thus causing its output to go negative and operate the ring relay 11. Changeover contacts RR1 and RR2 will respectively connect the A and B legs of the customer line pair to the internal A and B legs of the BURC interface and disconnect them from the A & B legs from the line card.

An unbalanced ringing source 16 now applies a 75 volt RMS ringing signal to the B leg and a negative 50 volt ring return battery to the A leg thus providing the unbalanced ringing signal to the customer pair as required. This signal will continue to be applied only so long as a ringing signal is applied by the line card as detected by the ringing detector 12. When ringing signals cease to be present then the output signal from the detector 12 is removed from the NAND gate 14 causing the relay 11 to return to normal and re-connecting the A & B legs through to the line card which is then responsible for detection of customer answer during the non-ringing phase.

Because the relay 11 (which may be a solid state relay) is only operated when ringing signals are present on the A & B legs, the unbalanced ringing output will follow the cadence of ringing signals provided by the line card whatever the selected cadence may be. Accordingly no other timing mechanism for ringing cadence is required within the interface 1 and such features as first burst ringing, continuous ringing, or selected operator cadences are replicated. Because the circuit 1 is only in contact with the A & B legs of the customer line during actual ringing bursts all other line card signalling is unaffected and features such as pre ring signalling or inter-burst signalling which may be applied by the line card are unaffected by inclusion of the interface 1.

To prevent excessive currents being provided by the ringing generator 16 limiting resistance 20A, 20B is included between the ringing generator and ring return battery and the A & B legs respectively.

Should a customer answer occur during one of the ringing bursts, then because the line card is not able to detect the presence of such a loop, it is necessary for the interface to provide such functionality, not least to prevent ringing signals causing acoustic shock at the customer premises equipment when an answer condition occurs. Accordingly whenever the relay 11 is in its operated state the loop detector 15 monitors the A & B legs of the customer pair for any apparent answer condition and on detection of a loop across the pair will output a signal to NAND gate 17 which will cause a loop detector relay 18 to operate, the same signal change via NAND gate 14 causing the ring relay 11 to release. Contact LD1 connects a loop impedance 19 across the A & B legs which sends an answer signal back to the line card so that it can enter a pre-answer state and cease the application of ringing while the contacts RR1 and RR2 return control of the customer pair to the line card.

The loop impedance 19 will also help to clamp the ringing voltage across the A & B legs of the customer pair during the changeover so that ringing signals do not cause acoustic shock at the customer premises equipment.

Figure 3:
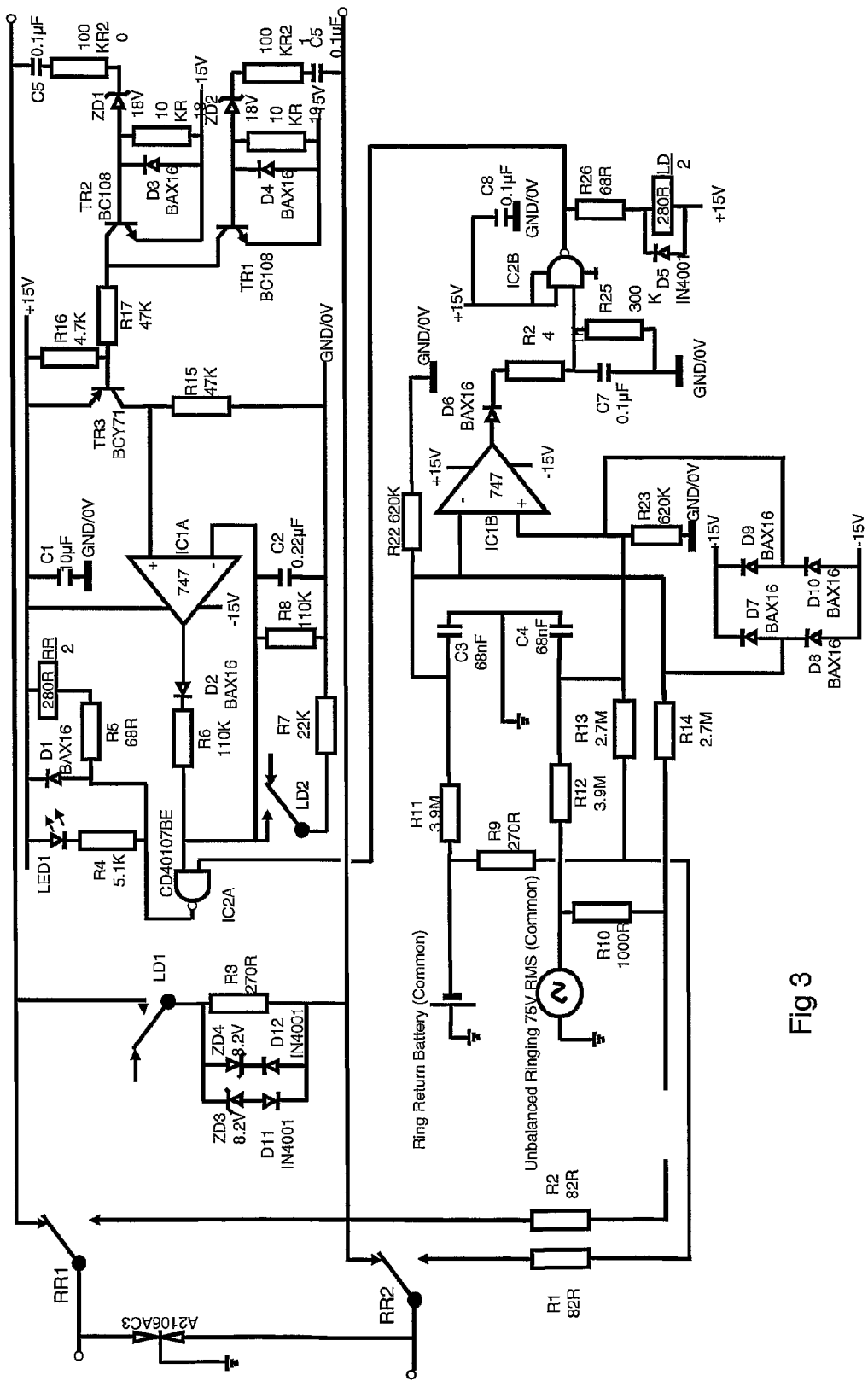
FIG. 3 is a circuit diagram showing the principle components of one version of the interface.

FIG. 3 shows an exemplary circuit capable of implementing the invention to perform the functions outline above. It will be noted that this is an example of an experimental implementation of the invention to enable testing of the principles and should not be considered as the sole method of implementation. The circuit is the copyright of the assignee and is included for completeness of description. No waiver of the copyright in the drawing, other than for the purposes of reproduction of the patent specification, is to be implied or granted by its inclusion.

In so far as possible it may be expected that the relays 11 and 18 and their respective switching functions may be implemented using solid state switching rather than electro-mechanical switching.

Although the detector 12 is referred to herein as a balanced ringing detector, it's design is such that it will also respond to unbalanced ringing signals received from a line card thus enabling it to be pre-inserted in a circuit prior to the switching over of a customer line from one kind of switching system to another. Accordingly the functionality of the interface can be tested with the unbalanced ringing generator 16 providing unbalanced ringing signals to the customer line on receipt of corresponding signals from the customer line card, again allowing the line card to function normally as the BURC interface 1 will not be in circuit other than when ringing is present.

The invention claimed is:

1. An interface for insertion in a telephone line between an exchange line and an outgoing customer line, said interface being arranged to:
   detect balanced analogue ringing signal from the exchange line,
   disconnect the outgoing customer line from the exchange line and to apply an unbalanced analogue ringing signal to the outgoing customer line during the presence of the balanced analogue ringing signaling, and
   provide a metallic path from the exchange line to the outgoing customer line during absence of the balanced analogue ringing signaling.

2. An interface as claimed in claim 1 which is also responsive to unbalanced ringing signaling from the exchange line to perform the same functions to facilitate preparation of outgoing customer lines during replacement of local telephone switches.

3. An interface according to claim 1 including a loop detector responsive to a connection across the outgoing customer line to provide a corresponding loop to the exchange line and to disconnect the unbalanced analogue ringing signal prior to providing the metallic path between the exchange line and the outgoing customer line.

4. An interface according to claim 1 including a by-pass connection between the exchange line and the outgoing customer line, said by-pass connection including a high pass filter to permit the transmission of digital signals while the metallic path between the exchange line and the outgoing customer line is disconnected.

5. An interface according to claim 1 including low pass filters to prevent transient signals caused by switching from affecting digital signal on the outgoing customer line.

6. An interface according to claim 5 including switched low pass filters.

7. An interface according to claim 5 including static low pass filters.

8. A method of providing an interface between an exchange line and an outgoing customer line, the method comprising:
   detecting presence or absence of a balanced analogue ringing signal from the exchange line;
   during the presence of the balanced analogue ringing signal, disconnecting the outgoing customer line from the exchange line and applying an unbalanced analogue ringing signal to the outgoing customer line; and
   during the absence of the balanced analogue ringing signal, providing a metallic path from the exchange line to the outgoing customer line.

9. The method as claimed in claim 8 further comprising:
   responsive to unbalanced ringing signaling from the exchange line, performing the same functions to facilitate preparation of outgoing customer lines during replacement of local telephone switches.

10. The method as claimed in claim 8 further comprising:
    responsive to a connection across the outgoing customer line, providing a corresponding loop to the exchange line and disconnecting the unbalanced analogue ringing signal prior to providing the metallic path between the exchange line and the outgoing customer line.

11. The method as claimed in claim 8 further comprising:
    establishing a by-pass connection between the exchange line and the outgoing customer line, said by-pass connection including a high pass filter to permit the transmission of digital signals while the metallic path between the exchange line and the outgoing customer line is disconnected.

12. The method as claimed in claim 8 further comprising:
    providing low pass filtering to prevent transient signals caused by switching from affecting digital signaling on the outgoing customer line.

\* \* \* \* \*

UNITED STATES PATENT AND TRADEMARK OFFICE
CERTIFICATE OF CORRECTION

PATENT NO. : 8,538,007 B2  Page 1 of 1
APPLICATION NO. : 12/096859
DATED : September 17, 2013
INVENTOR(S) : Michael D Hoy It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1427 days.

Signed and Sealed this

Fifteenth Day of September, 2015

Michelle K. Lee
*Director of the United States Patent and Trademark Office*